US008111935B2

(12) United States Patent
Chen et al.

(10) Patent No.: US 8,111,935 B2
(45) Date of Patent: Feb. 7, 2012

(54) IMAGE PROCESSING METHODS AND IMAGE PROCESSING APPARATUS UTILIZING THE SAME

(75) Inventors: Shing-Chia Chen, Tainan County (TW); Ling-Hsiu Huang, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 1161 days.

(21) Appl. No.: 11/866,422

(22) Filed: Oct. 3, 2007

(65) Prior Publication Data

US 2009/0092327 A1 Apr. 9, 2009

(51) Int. Cl.
G06K 9/40 (2006.01)

(52) U.S. Cl. ........ 382/254; 382/274; 382/169; 382/260; 382/272; 382/168

(58) Field of Classification Search .......... 382/168–170, 382/260, 272, 274
See application file for complete search history.

(56) References Cited

U.S. PATENT DOCUMENTS

| | | | | | |
|---|---|---|---|---|---|
| 5,410,418 | A | * | 4/1995 | Yonezawa | 382/169 |
| 5,524,070 | A | * | 6/1996 | Shin et al. | 382/274 |
| 7,835,588 | B2 | * | 11/2010 | Parkkinen et al. | 382/274 |
| 7,840,066 | B1 | * | 11/2010 | Chen et al. | 382/168 |
| 7,869,631 | B2 | * | 1/2011 | Xu et al. | 382/118 |
| 2002/0171852 | A1 | * | 11/2002 | Zhang et al. | 358/1.9 |
| 2003/0002747 | A1 | * | 1/2003 | Zaklika et al. | 382/260 |
| 2003/0174887 | A1 | * | 9/2003 | Oh et al. | 382/168 |
| 2004/0258324 | A1 | * | 12/2004 | Liang et al. | 382/274 |
| 2005/0013506 | A1 | * | 1/2005 | Yano | 382/274 |
| 2006/0098869 | A1 | * | 5/2006 | Chen | 382/167 |
| 2006/0126959 | A1 | * | 6/2006 | Padwick et al. | 382/254 |
| 2007/0286481 | A1 | * | 12/2007 | Monobe et al. | 382/169 |
| 2008/0123952 | A1 | * | 5/2008 | Parkkinen et al. | 382/168 |
| 2008/0247665 | A1 | * | 10/2008 | Hsu | 382/274 |
| 2009/0123068 | A1 | * | 5/2009 | Huang et al. | 382/169 |

OTHER PUBLICATIONS

Brightness—contrast enhancement, Ibrahim et al., IEEE, 00983063, vol. 53 No. 4, Nov. 2007, pp. 1752-1758.*

* cited by examiner

*Primary Examiner* — Jayesh A Patel
(74) *Attorney, Agent, or Firm* — Thomas|Kayden

(57) ABSTRACT

An image processing method applied in an image processor for processing an image including first pixels each having a pixel value, a first reference pixel value representing a mean value of the pixel values of the first pixels, the pixel values of the first pixels being distributed within a first distribution range bounded between a second reference pixel value and a third reference pixel value. Second pixels are selected from the first pixels. The pixel values of the second pixels are distributed within a second distribution range. The second distribution range of the second pixels is smaller than the first distribution range of the first pixels. A local characteristic of the image is obtained according to the second pixels. A parameter of the image is adjusted according to the local characteristic.

15 Claims, 19 Drawing Sheets

FIG. 3A

| 5 | 5 | 50  | 50  | 50  | 50  | 50  | 5 | 5 |
|---|---|-----|-----|-----|-----|-----|---|---|
| 5 | 5 | 50  | 50  | 50  | 50  | 50  | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 200 | 200 | 200 | 200 | 200 | 5 | 5 |
| 5 | 5 | 250 | 250 | 250 | 250 | 250 | 5 | 5 |
| 5 | 5 | 250 | 250 | 250 | 250 | 250 | 5 | 5 |
| 5 | 5 | 200 | 200 | 200 | 200 | 200 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 50  | 50  | 50  | 50  | 50  | 5 | 5 |
| 5 | 5 | 50  | 50  | 50  | 50  | 50  | 5 | 5 |

300

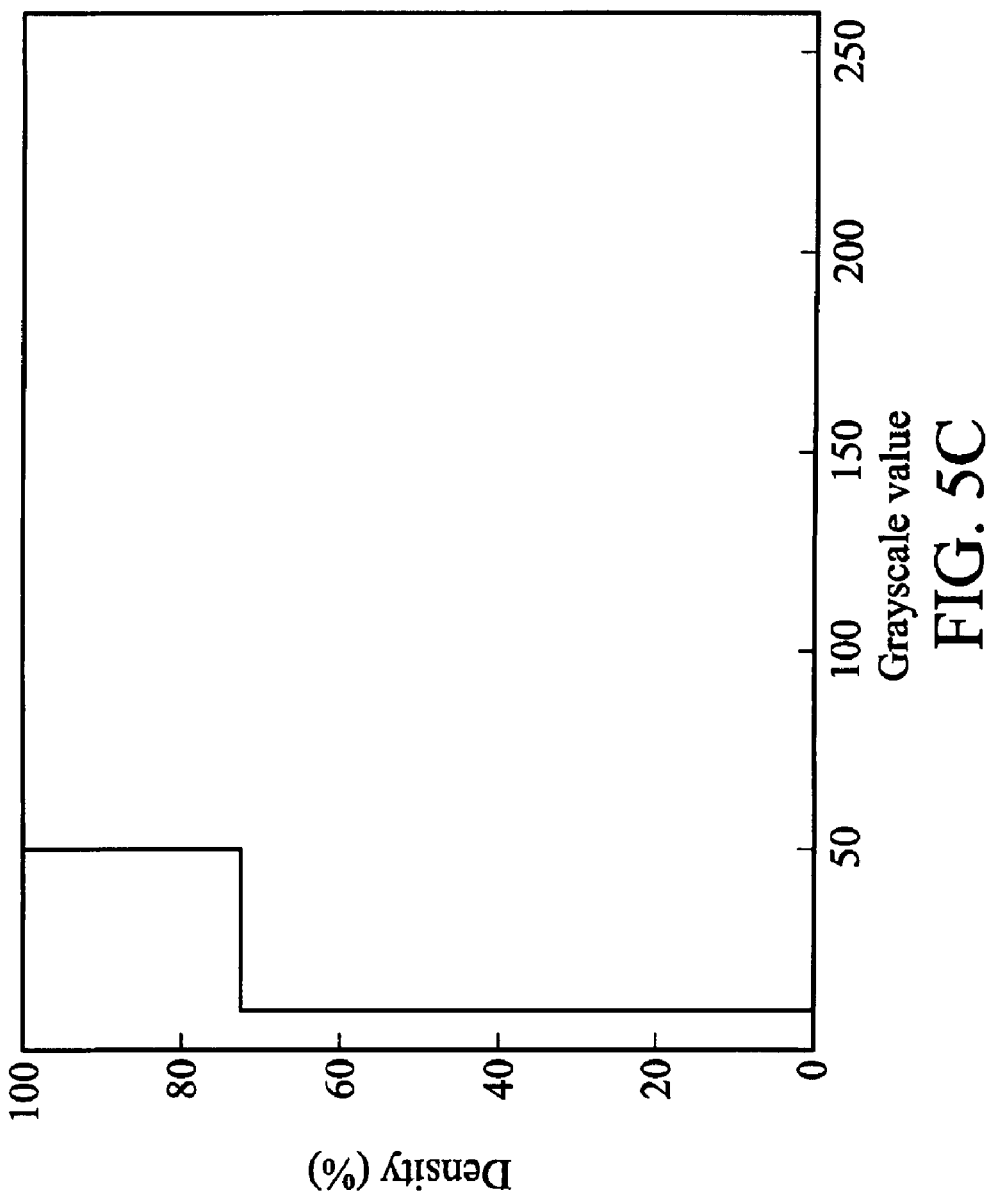

| 5 | 5 | 50 | 50 | 50 | 50 | 50 | 5 | 5 |
|---|---|---|---|---|---|---|---|---|
| 5 | 5 | 50 | 50 | 50 | 50 | 50 | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 200 | 200 | 200 | 200 | 200 | 5 | 5 |
| 5 | 5 | 250 | 250 | 250 | 250 | 250 | 5 | 5 |
| 5 | 5 | 250 | 250 | 250 | 250 | 250 | 5 | 5 |
| 5 | 5 | 200 | 200 | 200 | 200 | 200 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 50 | 50 | 50 | 50 | 50 | 5 | 5 |
| 5 | 5 | 50 | 50 | 50 | 50 | 50 | 5 | 5 |

FIG. 7A

| 5 | 5 | 50 | 50 | 50 | 50 | 50 | 5 | 5 |
|---|---|---|---|---|---|---|---|---|
| 5 | 5 | 50 | 50 | 50 | 50 | 50 | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 200 | 200 | 200 | 200 | 200 | 5 | 5 |
| 5 | 5 | 250 | 250 | 250 | 250 | 250 | 5 | 5 |
| 5 | 5 | 250 | 250 | 250 | 250 | 250 | 5 | 5 |
| 5 | 5 | 200 | 200 | 200 | 200 | 200 | 5 | 5 |
| 5 | 5 | 150 | 150 | 150 | 150 | 150 | 5 | 5 |
| 5 | 5 | 150 | 150 | 150 | 150 | 150 | 5 | 5 |
| 5 | 5 | 100 | 100 | 100 | 100 | 100 | 5 | 5 |
| 5 | 5 | 100 | 100 | 100 | 100 | 100 | 5 | 5 |
| 5 | 5 | 50 | 50 | 50 | 50 | 50 | 5 | 5 |
| 5 | 5 | 50 | 50 | 50 | 50 | 50 | 5 | 5 |

FIG. 9A

IMAGE PROCESSING METHODS AND IMAGE PROCESSING APPARATUS UTILIZING THE SAME

BACKGROUND OF THE INVENTION

1. Field of the Invention

The invention relates to an image processing method, and more particularly to an image processing method for adjusting image parameters according to the local characteristic of an image.

2. Description of the Related Art

With the development of digital signal processing, the technological development of digital image processing has also flourished. The digitalization of an image is to convert it into a form which can be stored in a computer's memory or some storage device such as a hard disk or CD-ROM. Once the image has been digitalized, it can be operated upon by various image processing operations, such as image compression, image enhancement, etc.

In an image processing context, the histogram of an image normally refers to a histogram of pixel values. A histogram is a graph showing the number of pixels in an image at each different pixel values found in that image. For an 8-bit grayscale image, there are 256 different possible pixel values, and so the histogram will graphically display 256 numbers showing the distribution of pixels amongst those grayscale values. Histograms can also be taken of color images, either individual histogram of red, green and blue channels can be taken, or a 3-D histogram can be produced, with the three axes representing the red, blue and green channels, and brightness at each point representing the pixel count. The exact output from the operation depends upon the implementation, it may simply be a picture of the required histogram in a suitable image format, or it may be a data file of some sort representing the histogram statistically.

FIG. 1A illustrates a histogram 10 of an 8-bit grayscale image. As described above, there are 256 different possible pixel values and the histogram 10 statistically shows the number of pixels in an image at each different pixel values found in that image. Some characteristic of the image can be found by analyzing the histogram, such as the most distributed grayscale value of the image. It is also possible to further derive the histogram 10 into some other form of statistical function, such as a density function 15 shown in FIG. 1B. By analyzing the histogram and other statistical functions derived by the histogram, a more detailed characteristic of the image can be found, and some image processing technologies, such as quantization and thresholding (converting a grayscale image into binary) can be operated upon the image according to histogram and/or other statistical functions.

BRIEF SUMMARY OF THE INVENTION

Image processing methods are provided. An exemplary embodiment of such an mage processing method applied in an image processor for processing an image provided by a host, the image comprising a plurality of first pixels each having a corresponding pixel value, a first reference pixel value representing a mean value of the corresponding pixel values of the first pixels, the corresponding pixel values of the first pixels being distributed within a first distribution range, wherein the first distribution range is bounded between a second reference pixel value and a third reference pixel value, the image processing method comprises selecting a plurality of second pixels from the first pixels, wherein the corresponding pixel values of the second pixels are distributed within a second distribution range, the second pixels are a portion of the first pixels, and the second distribution range of the second pixels is smaller than the first distribution range of the first pixels; obtaining a plurality of local characteristics of the image according to the second pixels; and adjusting a parameter of the image according to the local characteristics.

An exemplary embodiment of an image processing method applied in an image processor for processing an image provided by a host, the image comprising a plurality of first pixels each having a corresponding pixel value, a first reference pixel value representing a mean value of the corresponding pixel values of the first pixels, the corresponding pixel values of the first pixels being distributed within a first distribution range, wherein the first distribution range is bounded between a second reference pixel value and a third reference pixel value, the image processing method comprises selecting a plurality of second pixels and a plurality of third pixels from the first pixels, wherein the corresponding pixel values of the second pixels are distributed within a second distribution range and the corresponding pixel values of the third pixels are distributed within a third distribution range, the second pixels and the third pixels are portions of the first pixels, and the second distribution range of the second pixels and the third distribution range of the third pixels are smaller than the first distribution range of the first pixels; obtaining a plurality of local characteristics of the image according to the second pixels and the third pixels; and adjusting a parameter of the image according to the local characteristics.

An exemplary embodiment of an image processing apparatus for processing an image provided by a host and outputting a processed image to a display device, the image comprising a plurality of first pixels each having a corresponding pixel value, the image processing apparatus comprises an image analyzer obtaining a first reference pixel value representing a mean value of the corresponding pixel values of the first pixels, obtaining a first distribution range of the corresponding pixel values of the first pixels which is bounded between a second reference pixel value and a third reference pixel value, selecting a plurality of second pixels and a plurality of third pixels from the first pixels, obtaining a plurality of statistic functions according to the second pixels and the third pixels, and obtaining a plurality of the local characteristics according to the statistic functions, wherein the corresponding pixel values of the second pixels are distributed within a second distribution range and the corresponding pixel values of the third pixels are distributed within a third distribution range, the second pixels the third pixels are portions of the pixels, and the second distribution range of the second pixels and the third distribution range of the third pixels are smaller than the first distribution range of the first pixels; and an image processor adjusting a parameter of the image according to the local characteristics received from the image analyzer and outputting the processed image to the display device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIGS. 3A and 3B illustrate an 8-bit grayscale image and a corresponding histogram;

FIGS. 5A-5C respectively illustrate a pixel sub-set, a corresponding histogram, and a corresponding density function according to another embodiment of the invention;

FIGS. 7A-7B illustrate a pixel sub-set and a corresponding histogram according to another embodiment of the invention;

FIGS. 9A-9B illustrate a pixel sub-set and a corresponding histogram according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
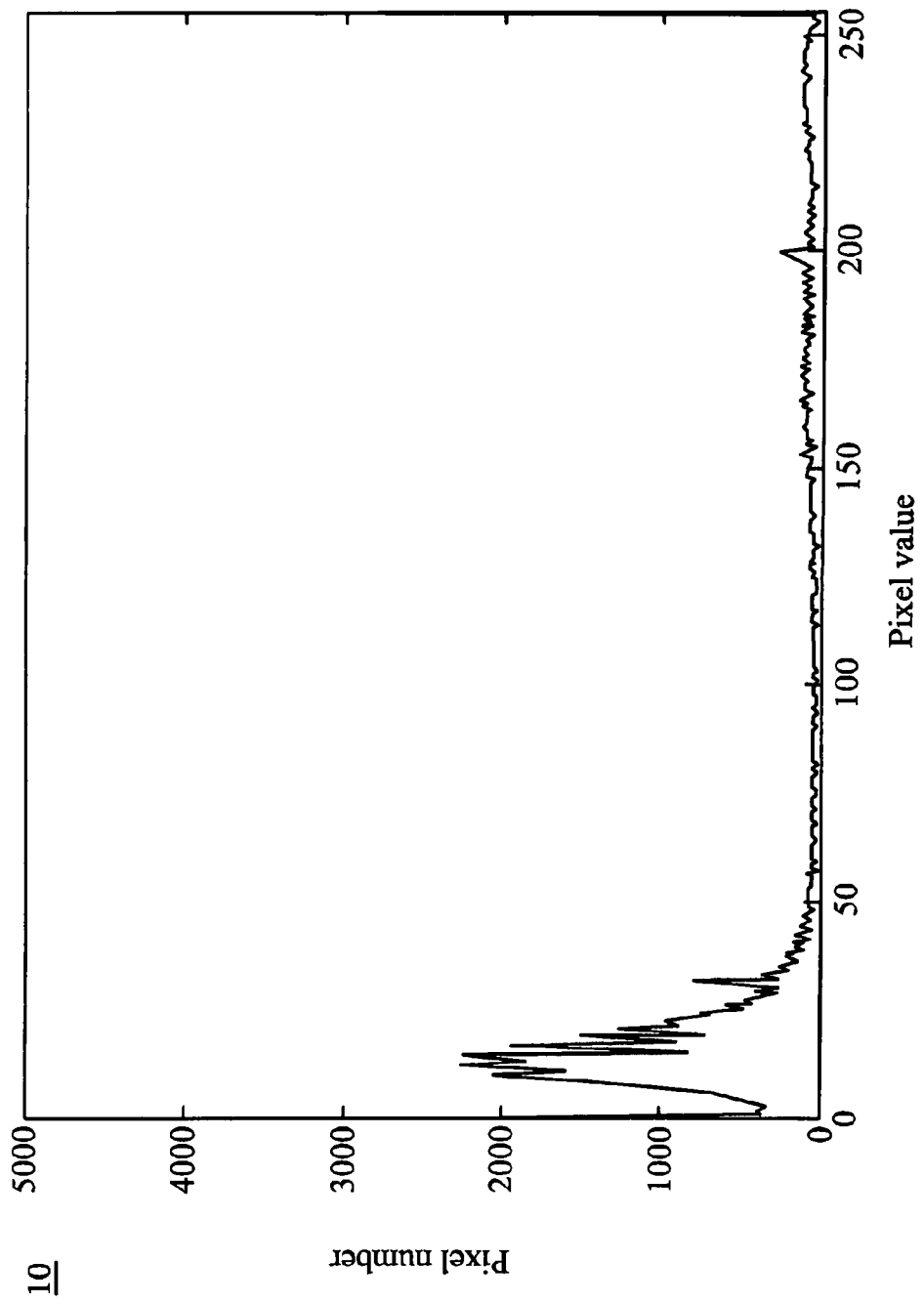
FIGS. 1A and 1B illustrate a histogram of an 8-bit grayscale image and the corresponding density function.
Figure 1B:
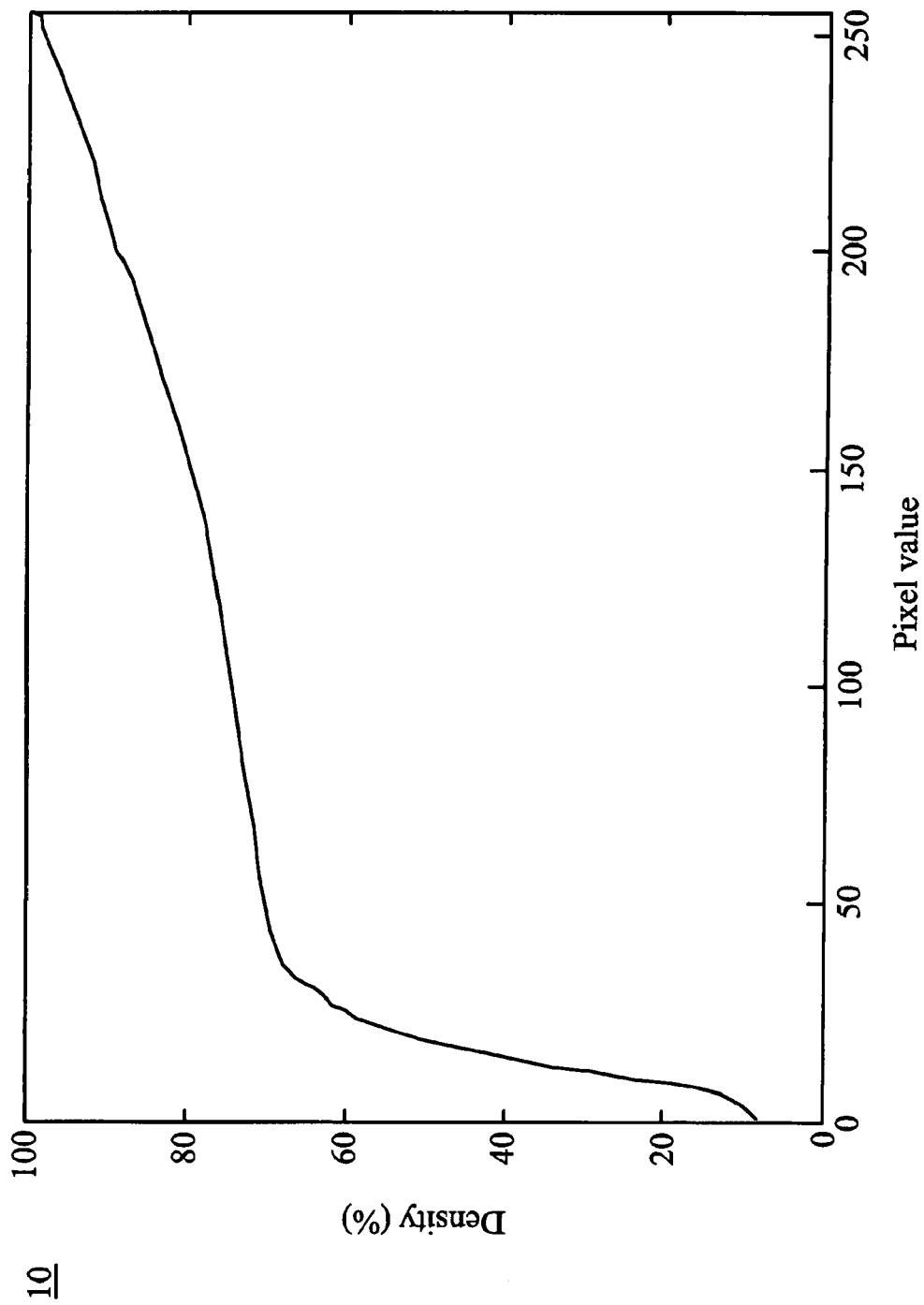
Figure 2:
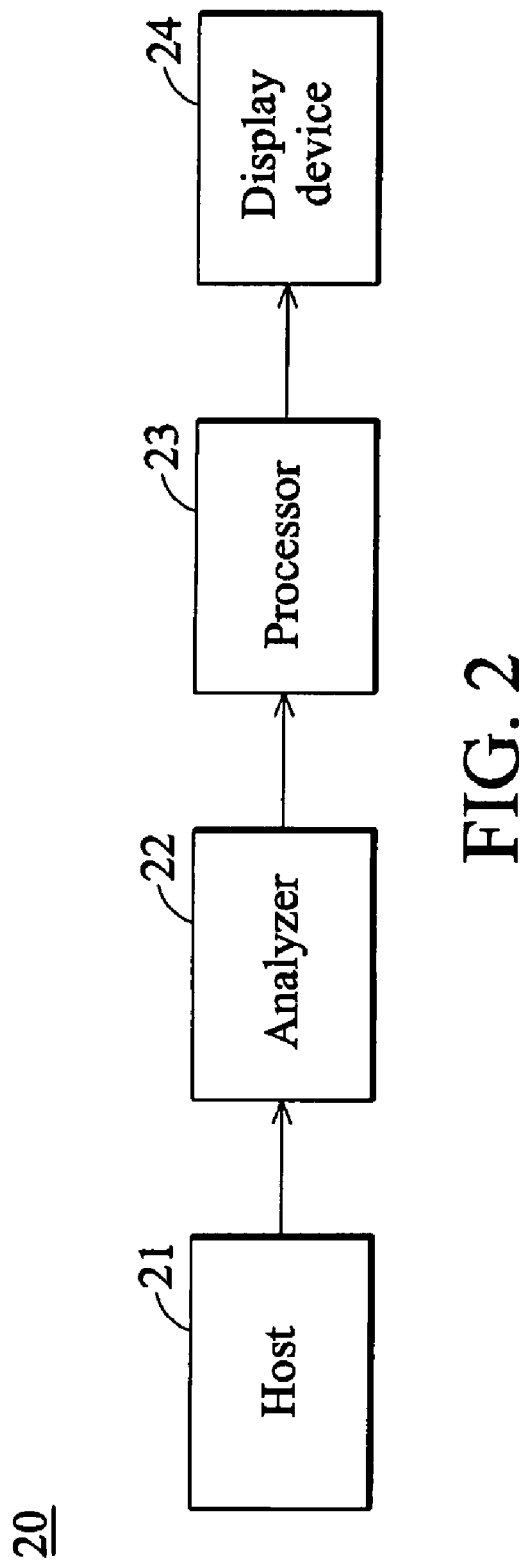
FIG. 2 illustrates an image processing apparatus according to one embodiment of the invention.
Figure 3B:
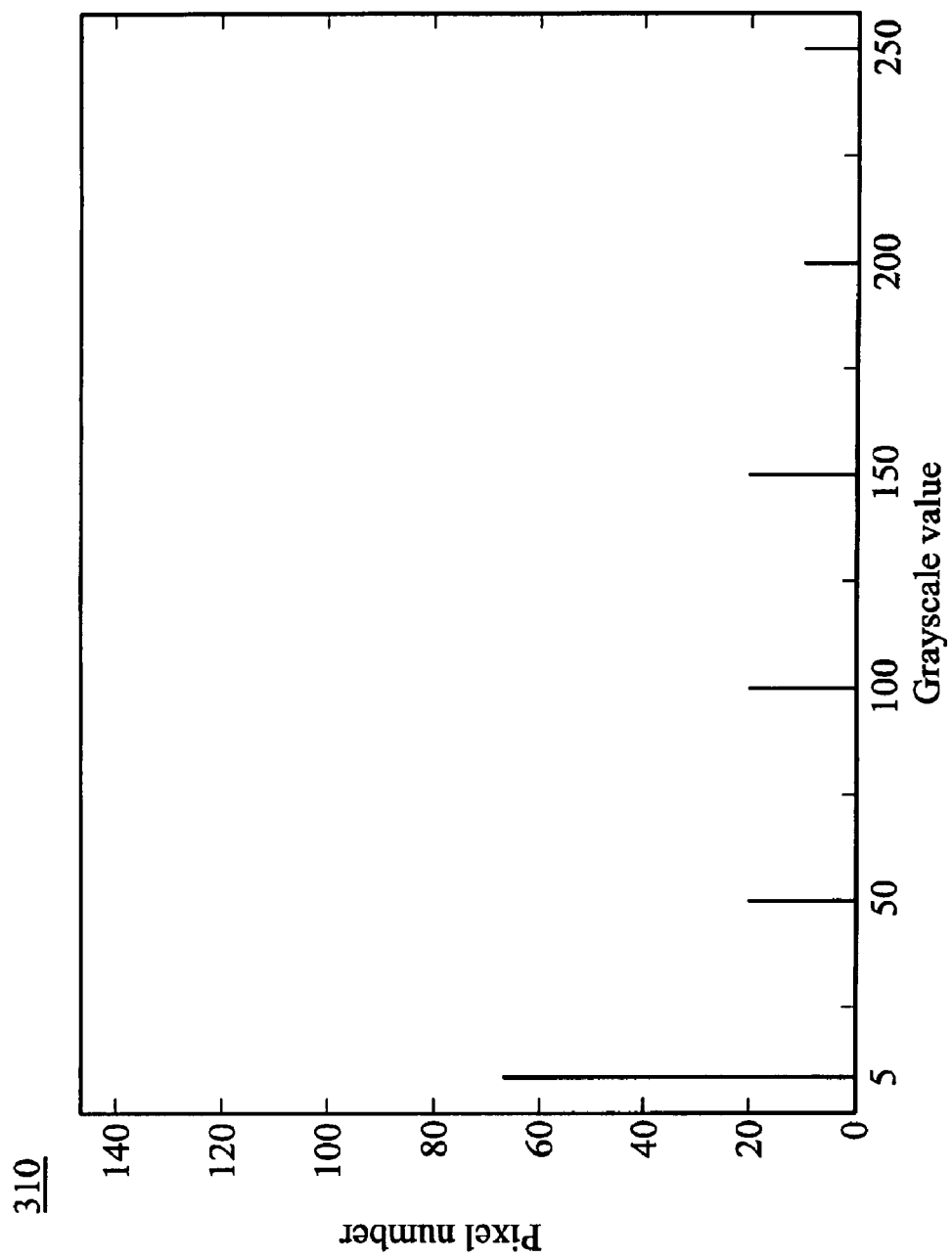

FIG. 2 illustrates an image processing apparatus 20 according to an embodiment of the invention. Image processing apparatus 20 comprises a host 21, an image analyzer 22, an image processor 23, and a display device 24. Image analyzer 22 analyzes an image provided by host 21, and outputs a plurality of local characteristics to image processor 23. Image processor 23 adjusts a parameter of the image according to the local characteristics and outputs the processed image to the display device 24. A detailed image processing procedure of image processing apparatus 20 will be illustrated in the following. FIG. 3A shows an exemplary 8-bit grayscale image 300 provided by host 21, wherein image 300 comprises 144 pixels (first pixels) each with a corresponding grayscale value distributed from 0-255. FIG. 3B illustrates a histogram 310 with respect to the images 300 obtained by image analyzer 22. It can be seen from histogram 310 that most of the pixels are distributed on the lower portion with grayscale values 0-100. According to the embodiment, a mean grayscale value of image 300 obtained by image analyzer 22 is about 75.14.

Figure 4A:
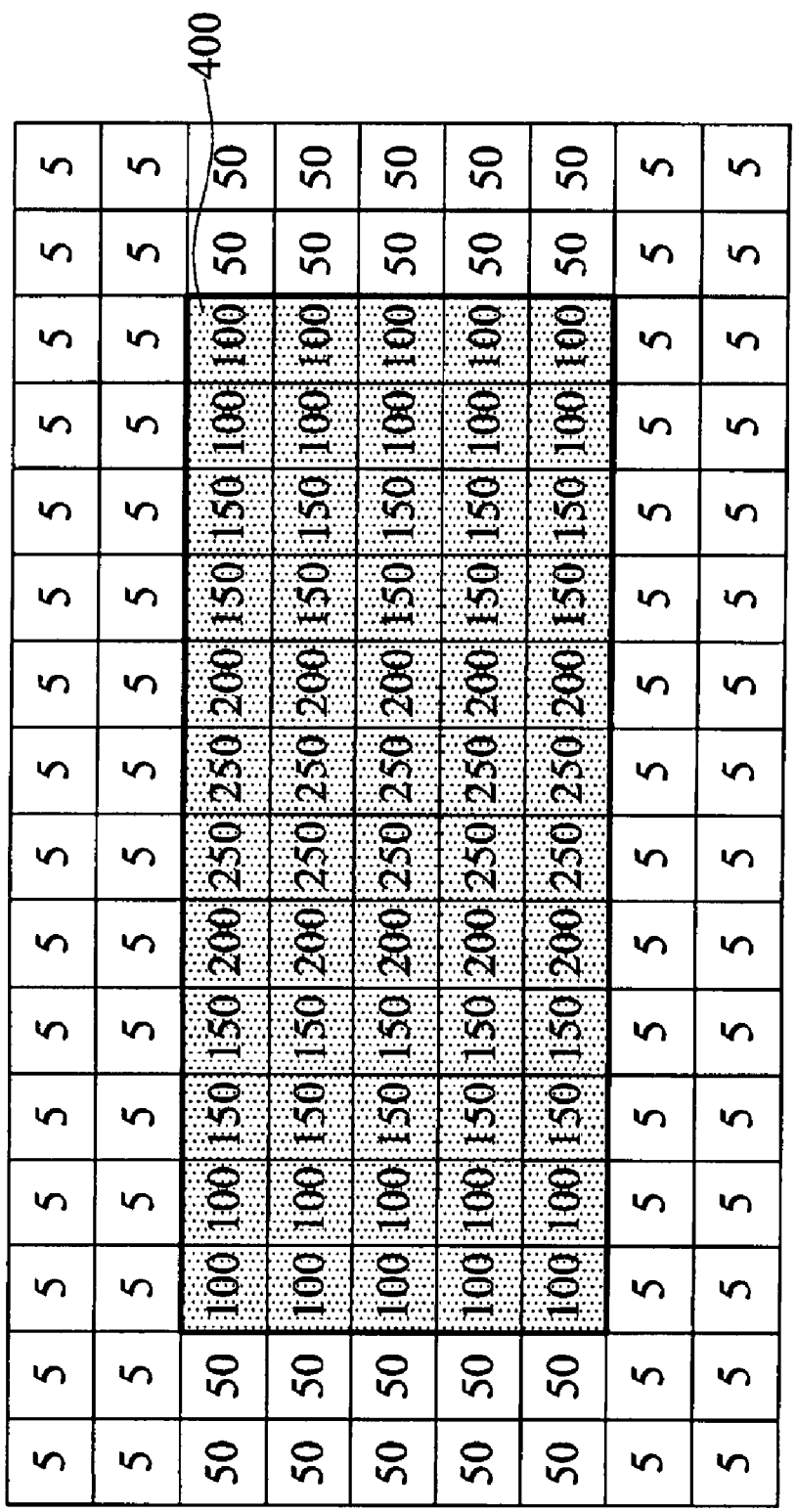
FIGS. 4A-4C respectively illustrate a pixel sub-set, a corresponding histogram, and a corresponding density function according to one embodiment of the invention.
Figure 4B:
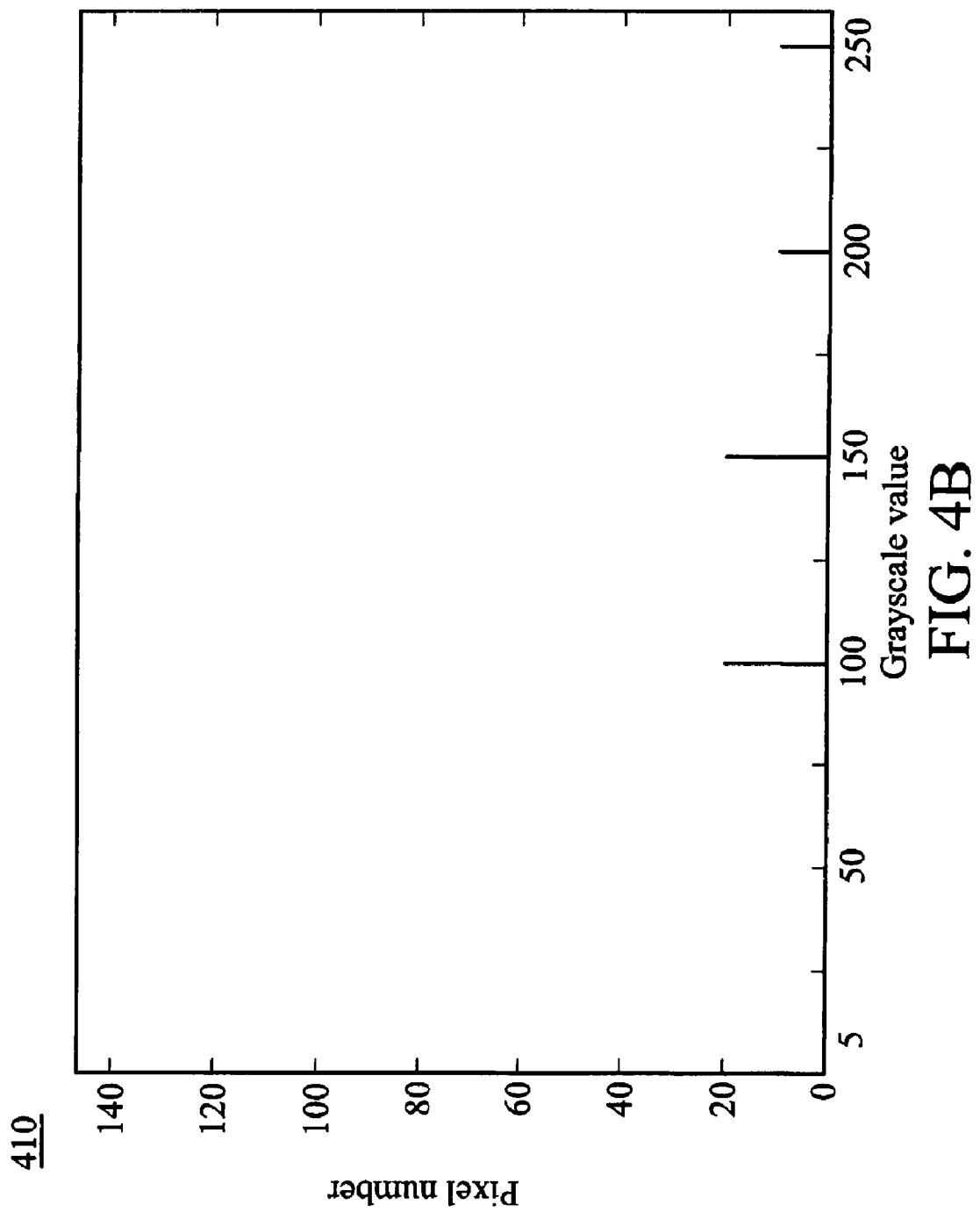
Figure 4C:
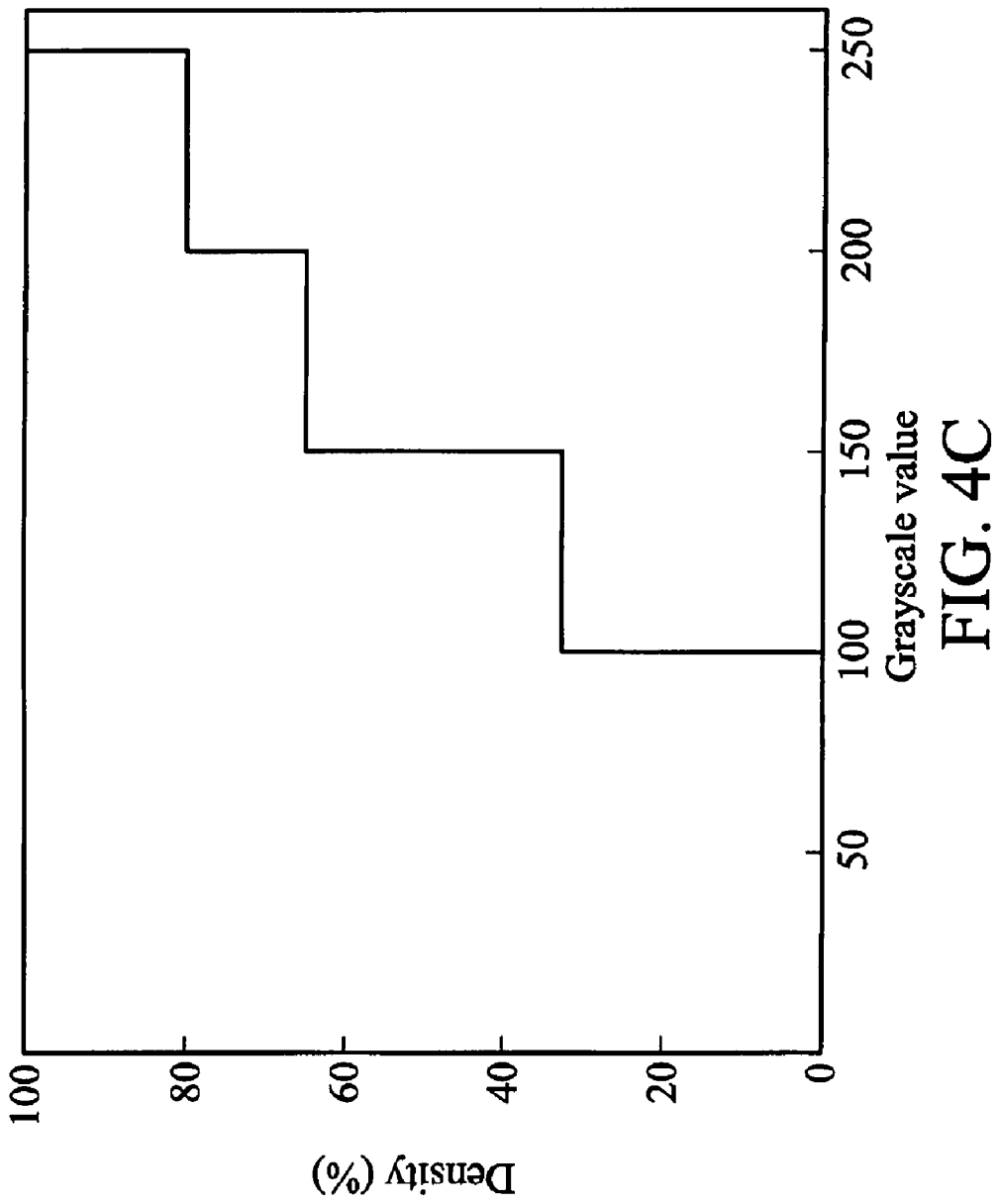

FIGS. 4A, 4B and 4C respectively illustrate a pixel sub-set (second pixels) 400, a corresponding histogram 410 of pixel sub-set 400, and a corresponding density function 420 of pixel sub-set 400 obtained by image analyzer 22 according to an embodiment of the invention. Pixel sub-set 400 is a sub-set of the pixels in image 300 with grayscale values exceeding a reference grayscale value. In the embodiment, the reference grayscale value is set as the mean grayscale value of image 300. However, in other embodiments, the reference grayscale value can be set as any numbers other than 0 and 255. For example, the reference grayscale value can be (mean+255)/2, wherein the mean refers to the mean grayscale value of the image. Histogram 410 reveals the distribution of pixel sub-set 400, which is bounded between grayscale values 75.14 and 255. Density function 420, being derived from histogram 410, is an example of a statistical function obtained by image analyzer 22. From density function 420, image analyzer 22 may obtain a plurality of local characteristics of the higher grayscale value portion in image 300 without the interference of the lower grayscale value portion in image 300, such as the slope of the density function 420. Image processor 23 can further adjust visual parameters of the image 300, such as brightness of image 300, according to the local characteristics received from image analyzer 22 and outputting the processed image to the display device 24.

Figure 5A:
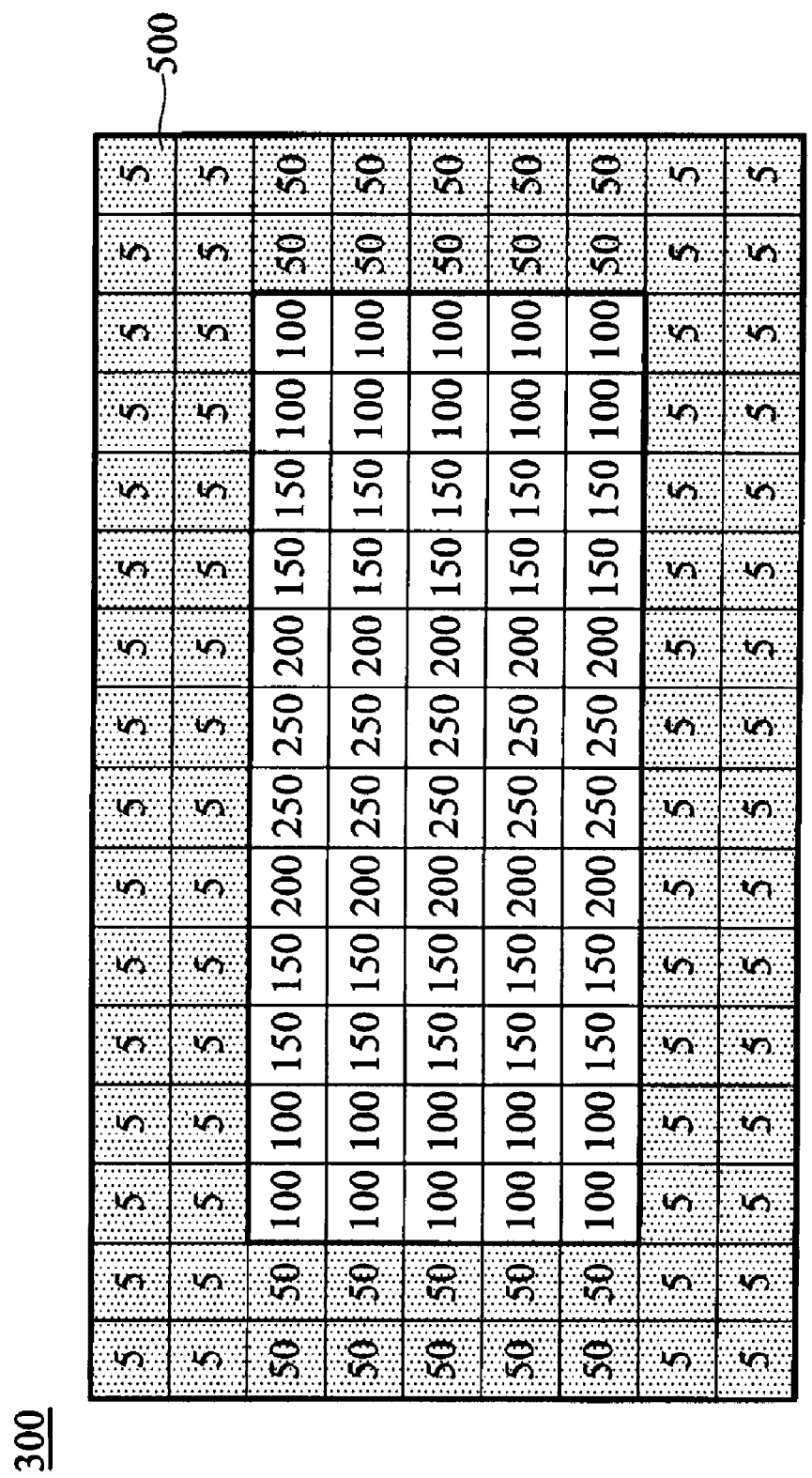
Figure 5B:
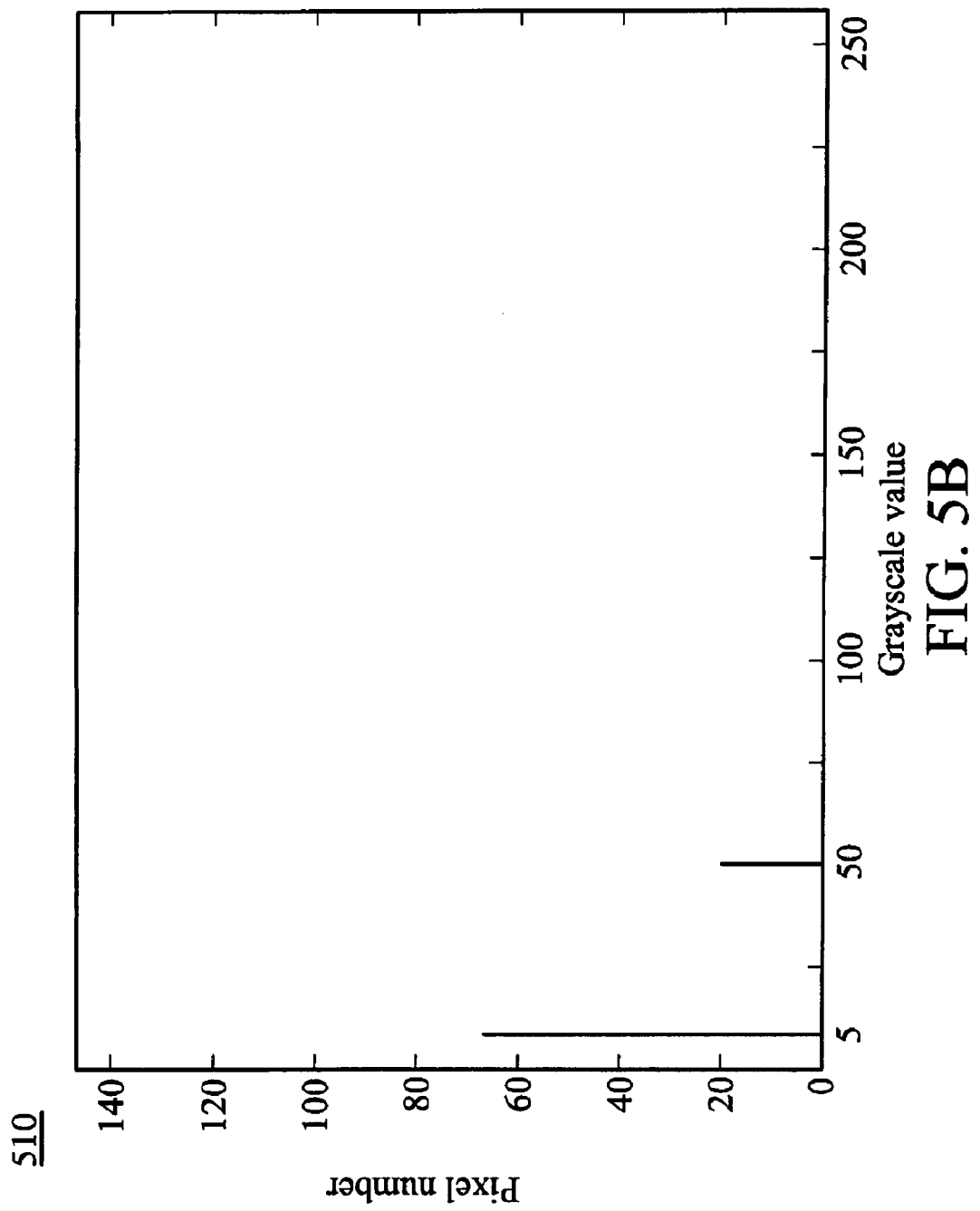

FIGS. 5A, 5B and 5C respectively illustrate another pixel sub-set (second pixels) 500, a corresponding histogram 510 of pixel sub-set 500, and a corresponding density function 520 of pixel sub-set 500 obtained by image analyzer 22 according to the embodiment of the invention. Pixel sub-set 500 is a sub-set of the pixels in image 300 with grayscale values not exceeding a reference grayscale value. In the embodiment, the reference grayscale value is set as the mean grayscale value of image 300. However, according to other embodiments, the reference grayscale value can be set as any numbers other than 0 and 255, for example, the reference grayscale value can be mean/2, wherein the mean refers to the mean grayscale value of the image. Histogram 510 reveals the distribution of pixel sub-set 500, which is bounded between grayscale values 0 and 75.14. Density function 520, being derived from histogram 510, is an example of statistical function obtained by image analyzer 22. From density function 520, image analyzer 22 may obtain a plurality of local characteristics of the lower grayscale value portion in image 300 without the interference of the higher grayscale value portion in image 300. Image processor 23 can further adjust parameters of the image 300, such as contrast of image 300, according to the local characteristics received from image analyzer 22 and outputting the processed image to the display device 24.

Figure 6:
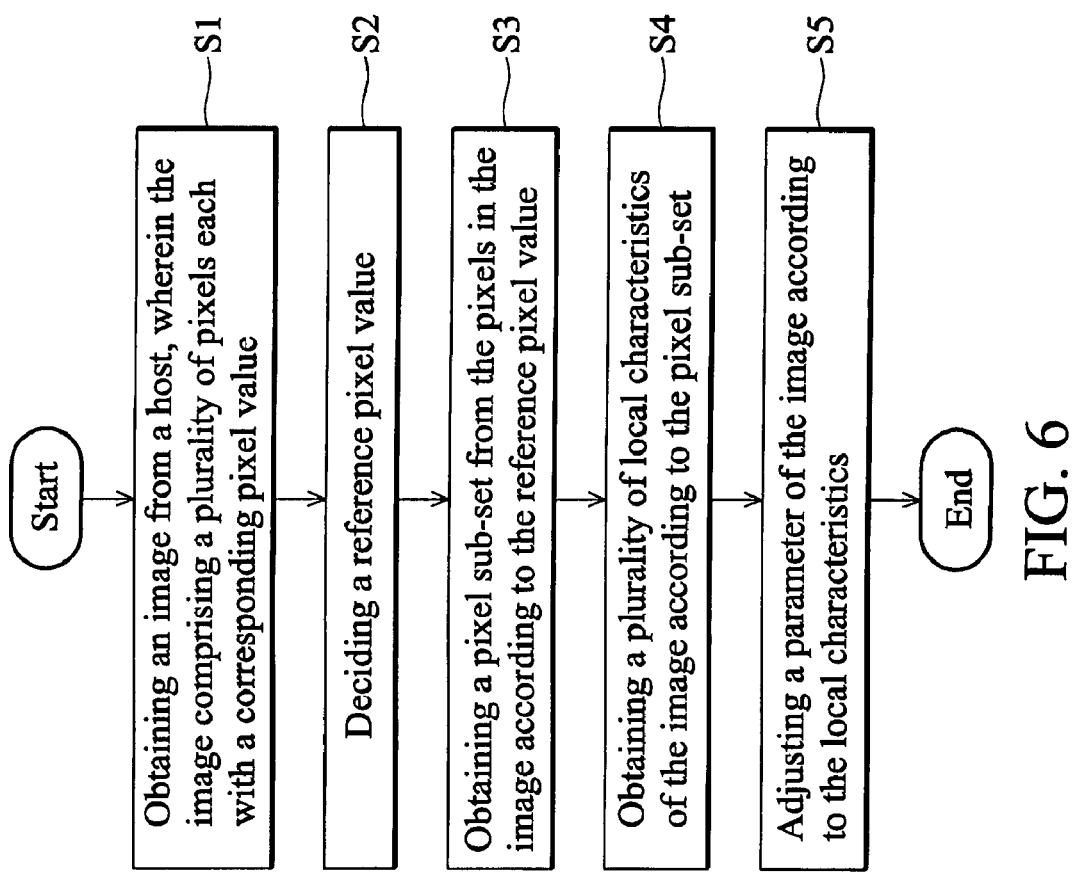
FIG. 6 illustrates a flow chart of the image processing method according to the embodiment of the invention.

FIG. 6 illustrates a flow chart of the image processing method according to the embodiment described above. First, an image is obtained from a host, wherein the image comprises a plurality of first pixels each having a corresponding pixel value (S1). Next, a reference pixel value is decided (S2), for example, the reference pixel value can be set as the mean pixel value of the image, or one-half of the mean pixel value of the image. Next, a plurality of pixel sub-sets (second pixels) is selected from the first pixels in the image according to the reference pixel value (S3). Next, a plurality of local characteristics of the image is obtained according to the second pixels (S4). Finally, a parameter of the image according to the local characteristics (S5) is adjusted.

Figure 7B:
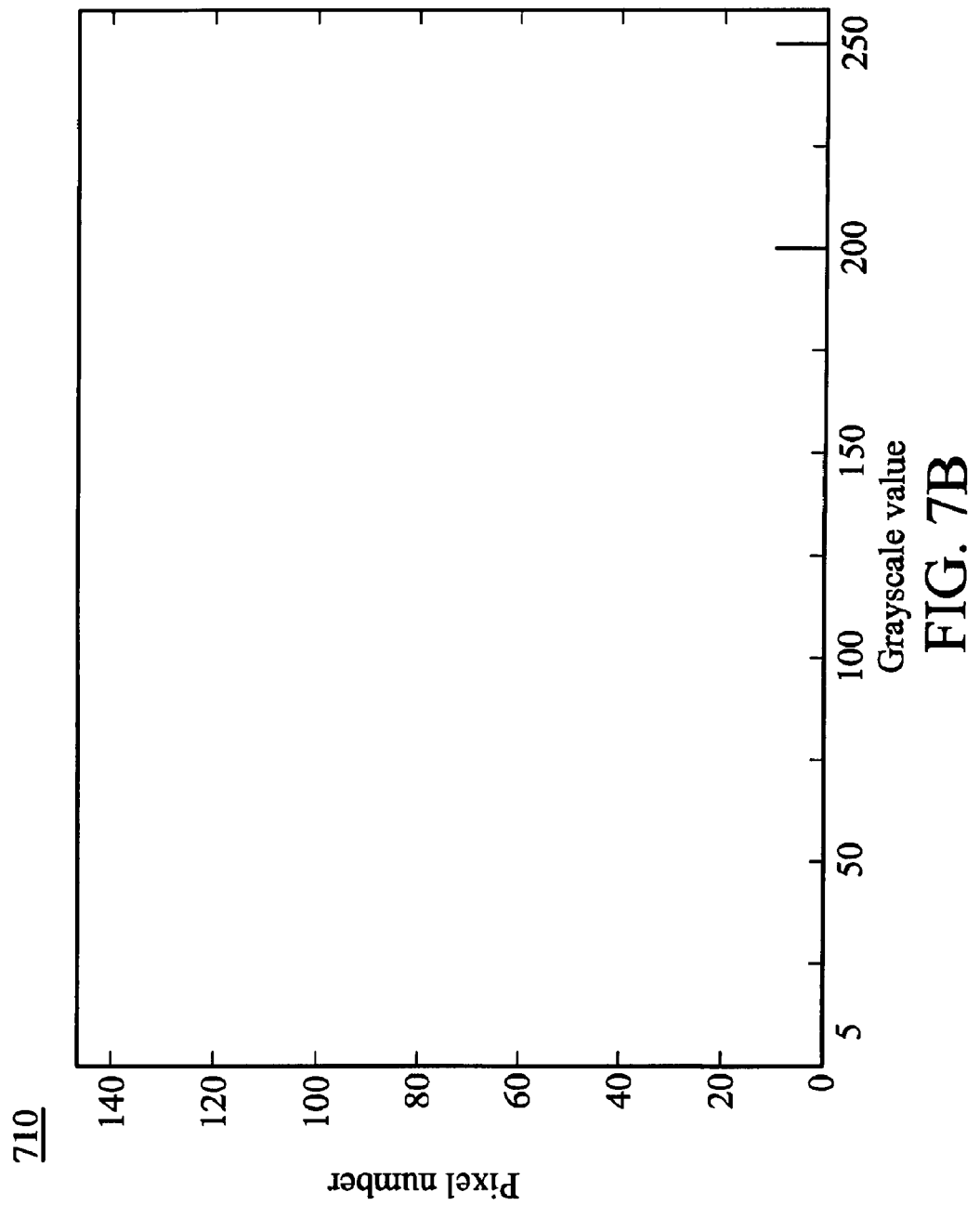
Figure 8A:
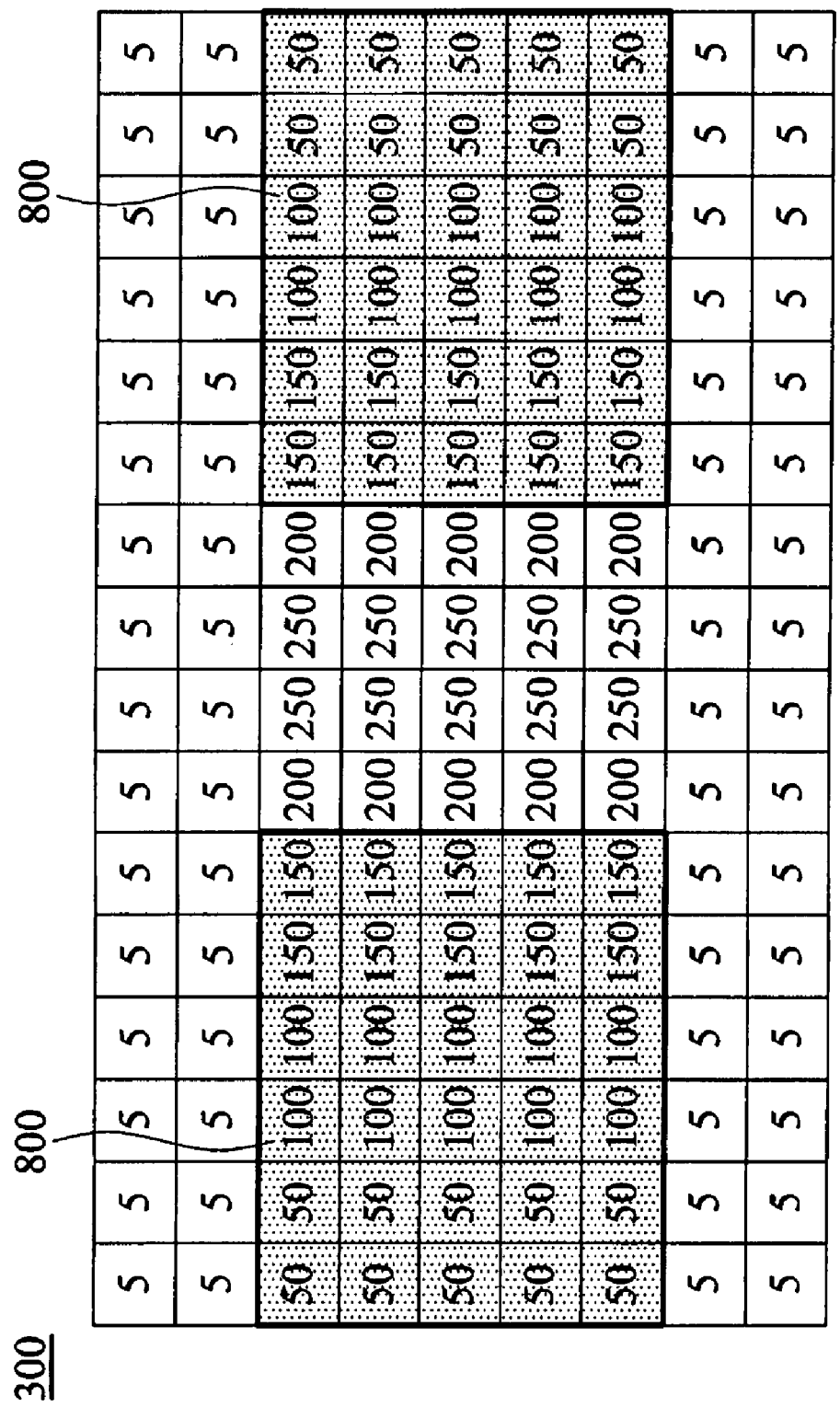
FIGS. 8A-8B illustrate a pixel sub-set and a corresponding histogram according to another embodiment of the invention.
Figure 8B:
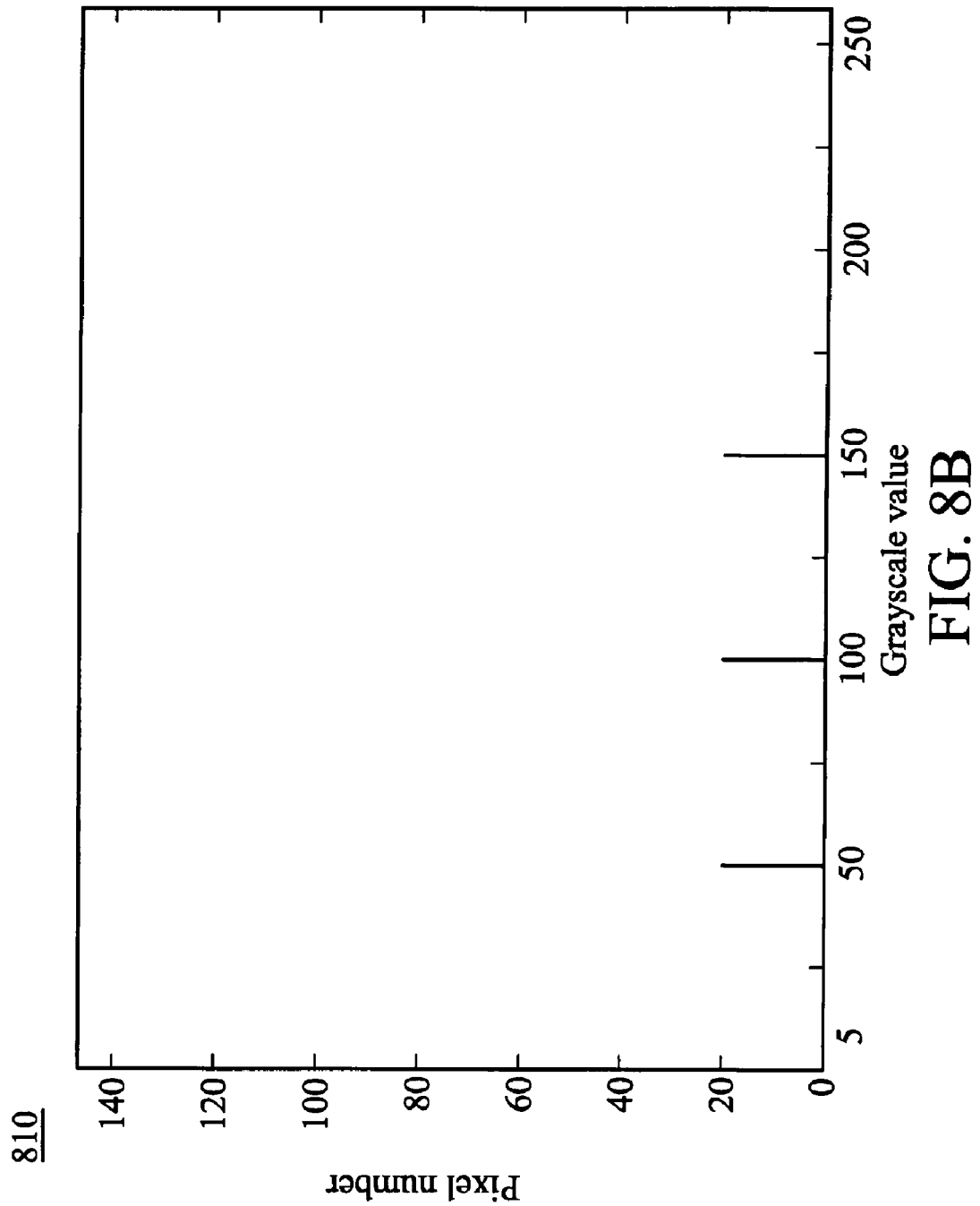
Figure 9B:
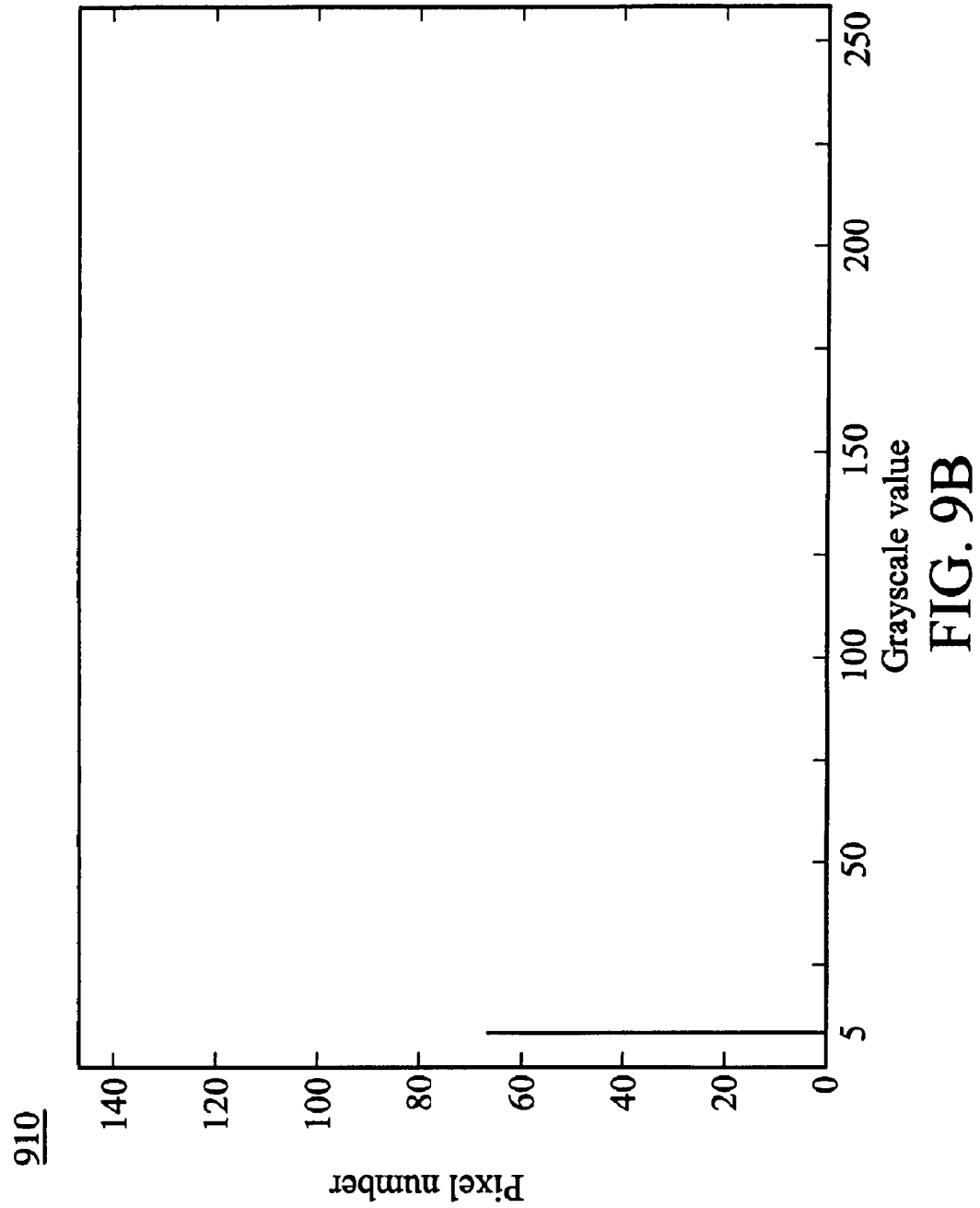

According to another embodiment of the invention, image analyzer 22 can also obtain a plurality of pixel sub-sets from the pixels in an image. FIGS. 7A, 8A and 9A illustrate a plurality of pixel sub-sets 700 (second pixels), 800 (third pixels), and 900 (fourth pixels) obtained by image analyzer 22 according to one embodiment of the invention. And FIGS. 7B, 8B and 9B illustrate the corresponding histograms 710, 810, and 910 of pixel sub-sets 700, 800, and 900, respectively. Pixel sub-set 700 shown in FIG. 7A is a sub-set of the pixels in image 300 with grayscale values exceeding a first reference grayscale value. In this embodiment, the first reference grayscale value is set as (mean+255)/2. However, the first reference grayscale value can be set as any other numbers. Histogram 710 shown in FIG. 7B reveals the distribution of pixel sub-set 700, which is the higher portion of the grayscale values in image 300 and is bounded between grayscale values 165 and 255. Pixel sub-set 800 shown in FIG. 8A is a sub-set of the pixels in image 300 with grayscale values distributed between the first reference grayscale value and a second reference grayscale value. In this embodiment, the second reference grayscale value is set to 37 (about half of the mean). However, the second reference grayscale value can be set as any other numbers. Histogram 810 shown in FIG. 8B reveals the distribution of pixel sub-set 800, which is the middle portion of the grayscale values in image 300 and is bounded between grayscale values 37 and 165. Pixel sub-set 900 shown in FIG. 9A is a sub-set of the pixels in image 300 with grayscale values not exceeding the second reference grayscale value, and histogram 910 shown in FIG. 9B reveals the distribution of pixel sub-set 900, which is the lower portion of the grayscale values in image 300 and is bounded between grayscale values 0 and 37.

According to the embodiments of the invention, image analyzer 22 may obtain a plurality of individual local characteristics of the higher portion, the middle portion, and the lower portion of grayscale values in image 300. Image processor 23 can further adjust visual parameters of the image 300 according to the local characteristics received from image analyzer 22 and output the processed image to the display device 24.

Figure 10:
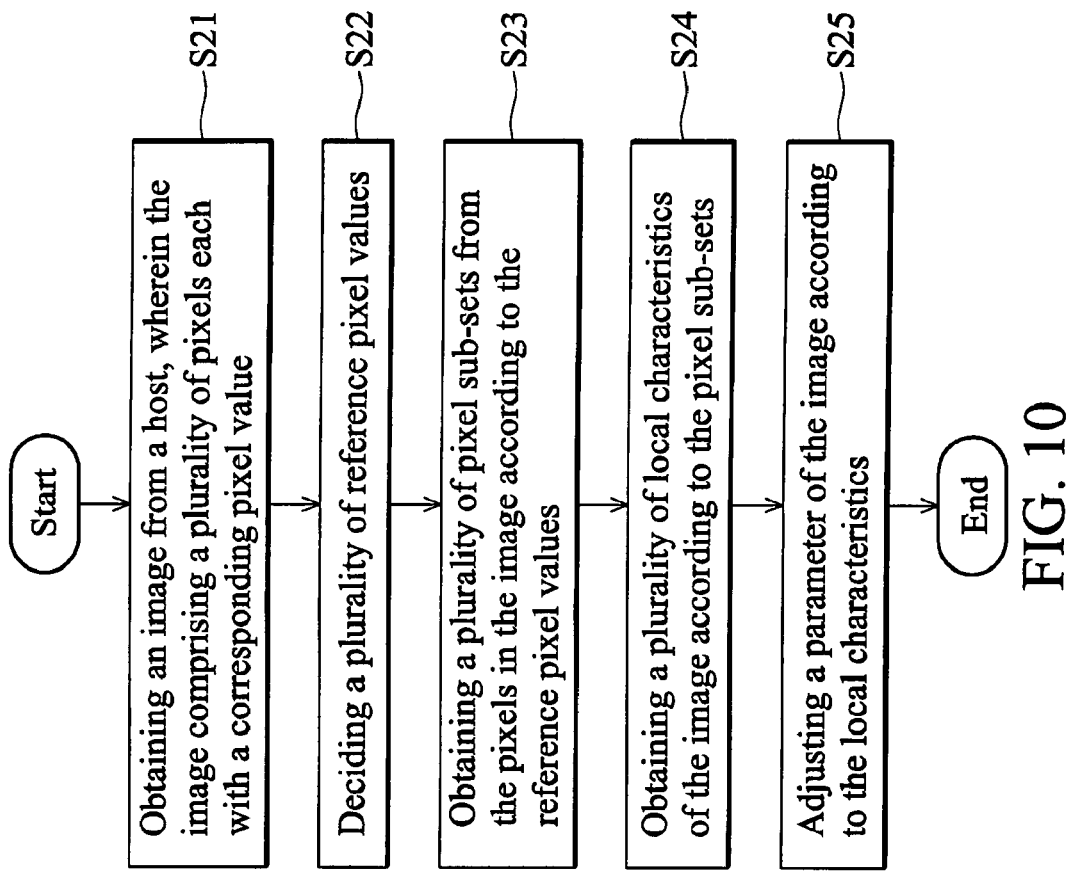
FIG. 10 illustrates a flow chart of the image processing method according to another embodiment of the invention.

FIG. 10 illustrates a flow chart of the image processing method according to the embodiment described above. First, an image is obtained from a host, wherein the image comprises a plurality of first pixels each having a corresponding pixel value (S21). Next, a plurality of reference pixel values is decided (S22), for example, the reference pixels value can be set as the mean pixel value of the image, or the half of the mean pixel value of the image. Next, a plurality of pixel sub-sets is obtained from the first pixels in the image according to the reference pixel values (S23). Next, a plurality of local characteristics of the image is obtained according to the pixel sub-sets (S24). Finally, a parameter of the image according to the local characteristics (S25) is adjusted.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing method applied in an image processor for processing an image, the image comprising a plurality of first pixels each having a pixel value, a first reference pixel value representing a mean value of the pixel values of the first pixels, the pixel values of the first pixels being distributed within a first distribution range, the image processing method comprising:
   selecting a plurality of second pixels from the first pixels, wherein the pixel values of the second pixels are distributed within a second distribution range smaller than the first distribution range of the first pixels;
   obtaining a local characteristic of the image according to the second pixels; and
   adjusting a parameter of the image according to the local characteristic;
   wherein the first distribution range is bounded between a second reference pixel value and a third reference pixel value, and the second distribution range is bounded between the second reference pixel value and a fourth reference pixel value other than the third reference pixel value; and
   wherein the fourth reference pixel value equals to a mean value of the first reference pixel value and the second reference pixel value.

2. The image processing method as claimed in claim 1, wherein the step of obtaining the local characteristic further comprises:
   obtaining a statistical function according to the second pixels; and
   obtaining the local characteristic according to the statistical function.

3. The image processing method as claimed in claim 1, wherein the parameter is the brightness of the image.

4. The image processing method as claimed in claim 1, wherein the parameter is the contrast of the image.

5. An image processing method applied in an image processor for processing an image, the image comprising a plurality of first pixels each having a pixel value, a first reference pixel value representing a mean value of the pixel values of the first pixels, the pixel values of the first pixels being distributed within a first distribution range, the image processing method comprising:
   selecting a plurality of second pixels and a plurality of third pixels from the first pixels, wherein the pixel values of the second pixels are distributed within a second distribution range and the pixel values of the third pixels are distributed within a third distribution range, the second distribution range of the second pixels and the third distribution range of the third pixels are smaller than the first distribution range of the first pixels;
   obtaining a local characteristic of the image according to the second pixels and the third pixels; and
   adjusting a parameter of the image according to the local characteristic;
   wherein the first distribution range is bounded between a second reference pixel value and a third reference pixel value, the second distribution range is bounded between the second reference pixel value and a fourth reference pixel value not equal to the third reference pixel value, and the third distribution range is bounded between the third reference pixel value and a fifth reference pixel value not equal to the second reference pixel value; and
   wherein the fourth reference pixel value equals to a mean value of the first reference pixel value and the second reference pixel value.

6. The image processing method as claimed in claim 5, wherein the step of obtaining the local characteristic further comprises:
   obtaining a statistical function according to the second pixels and the third pixels; and
   obtaining the local characteristic according to the statistical function.

7. The image processing method as claimed in claim 5, wherein the parameter is brightness or contrast of the image.

8. The image processing method as claimed in claim 5, wherein the fourth reference pixel value equals to the fifth reference pixel value.

9. The image processing method as claimed in claim 5, wherein the fourth reference pixel value does not equal to the fifth reference pixel value.

10. The image processing method as claimed in claim 9, further comprising:
   obtaining a plurality of fourth pixels from the first pixels, wherein the pixel values of the fourth pixels are distributed within a fourth distribution range, and the fourth distribution range is bounded between the fourth reference pixel value and the fifth reference pixel value;
   obtaining a statistical function according to the second pixels, the third pixels and the fourth pixels;
   obtaining the local characteristic according to the statistical function; and
   adjusting a parameter of the image according to the local characteristic.

11. An image processing apparatus for processing an image provided by a host and outputting a processed image to a display device, the image comprising a plurality of first pixels each having a pixel value, a first reference pixel value representing a mean value of the pixel values of the first pixel, the image processing apparatus comprising:
- an image analyzer obtaining a first distribution range of the pixel values of the first pixels, selecting a plurality of second pixels and a plurality of third pixels from the first pixels, obtaining a statistic function according to the second pixels and the third pixels, and obtaining a local characteristic according to the statistical function, wherein the pixel values of the second pixels are distributed within a second distribution range and the pixel values of the third pixels are distributed within a third distribution range, and the second distribution range of the second pixels and the third distribution range of the third pixels are smaller than the first distribution range of the first pixels; and
- an image processor adjusting a parameter of the image according to the local characteristic received from the image analyzer and outputting the processed image to the display device;
- wherein the first distribution range is bounded between a second reference pixel value and a third reference pixel value, the second distribution range is bounded between the second reference pixel value and a fourth reference pixel value not equal to the third reference pixel value, and the third distribution range is bounded between the third reference pixel value and a fifth reference pixel value not equal to the second reference pixel value; and
- wherein the fourth reference pixel value equals to a mean value of the first reference pixel value and the second reference pixel value.

12. The image processing apparatus as claimed in claim 11, wherein the parameter is brightness or contrast of the image.

13. The image processing apparatus as claimed in claim 11, wherein the fourth reference pixel value equals to the fifth reference pixel value.

14. The image processing apparatus as claimed in claim 11, wherein the fourth reference pixel value does not equal to the fifth reference pixel value.

15. The image processing apparatus as claimed in claim 14, wherein the image analyzer further obtains a plurality of fourth pixels from the first pixels, obtains the statistical function according to the second pixels, the third pixels and the fourth pixels, and obtains the local characteristic according to the statistical function, wherein the pixel values of the fourth pixels are distributed within a fourth distribution range, and the fourth distribution range is bounded between the fourth reference pixel value and the fifth reference pixel value.

* * * * *